May 15, 1934.　　　　　H. H. LINN　　　　　1,959,168
VEHICLE CONSTRUCTION
Filed Nov. 10, 1931　　3 Sheets-Sheet 1
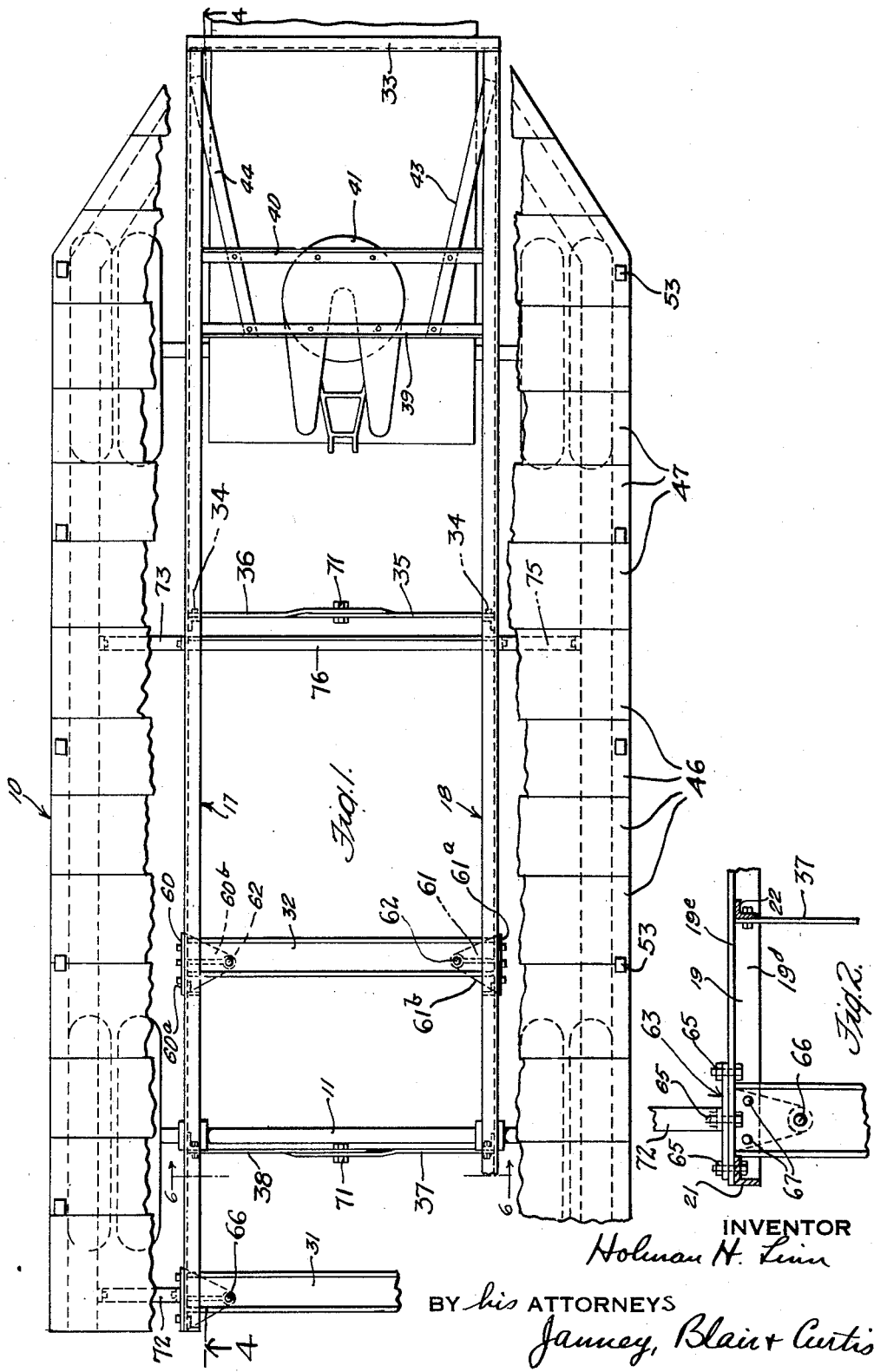
INVENTOR
Holman H. Linn
BY his ATTORNEYS
Janney, Blair + Curtis May 15, 1934.    H. H. LINN    1,959,168
VEHICLE CONSTRUCTION
Filed Nov. 10, 1931    3 Sheets-Sheet 2
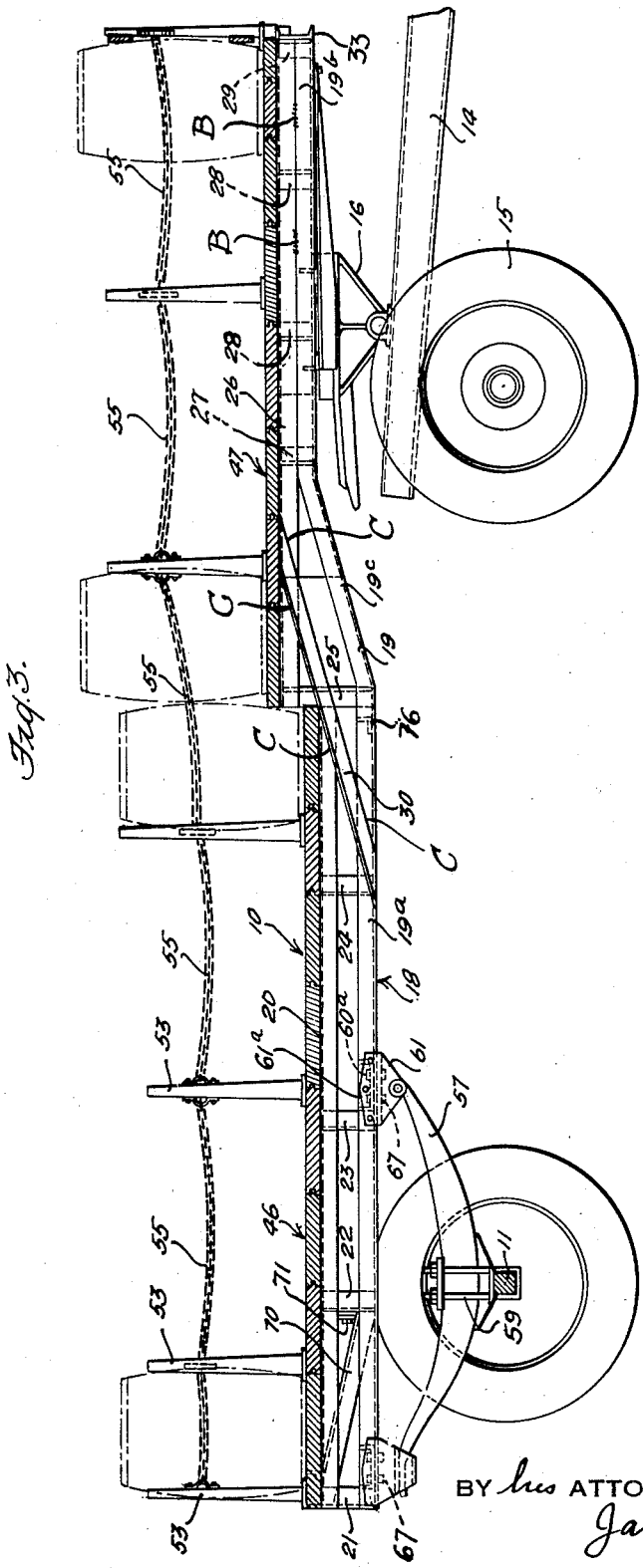
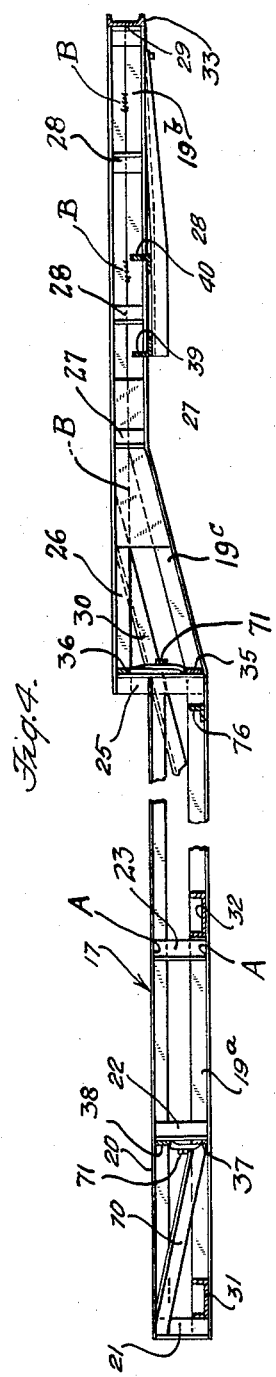
INVENTOR
Holman H. Linn
BY his ATTORNEYS
Janney, Blair & Curtis May 15, 1934.    H. H. LINN    1,959,168
VEHICLE CONSTRUCTION
Filed Nov. 10, 1931    3 Sheets-Sheet 3
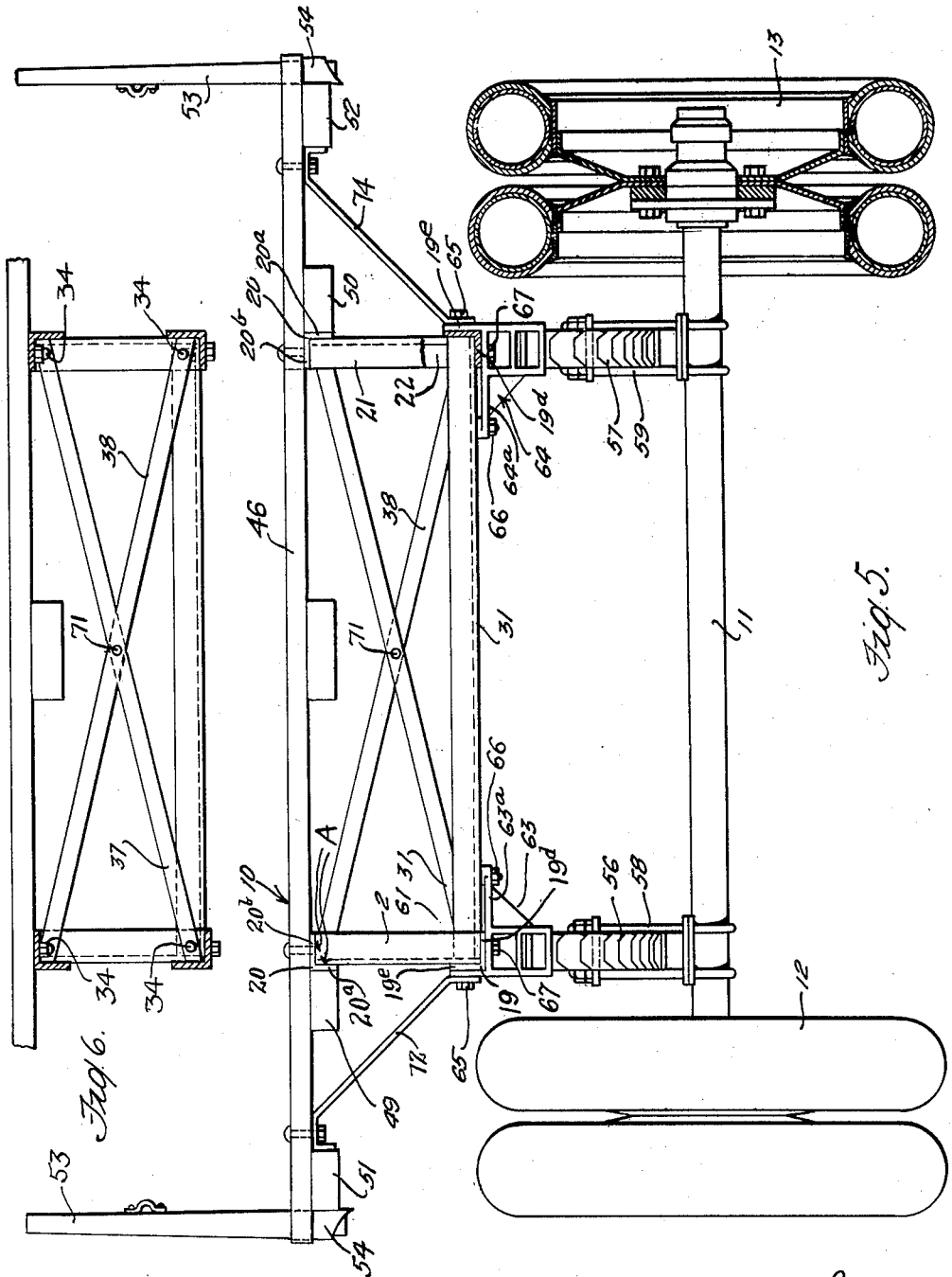

Patented May 15, 1934

1,959,168

UNITED STATES PATENT OFFICE 1,959,168

VEHICLE CONSTRUCTION

Holman H. Linn, Morris, N. Y., assignor to Linn Trailer Corporation, Oneonta, N. Y., a corporation of New York Application November 10, 1931, Serial No. 574,135

7 Claims. (Cl. 280—106)

This invention relates to vehicle construction and more particularly to trailer construction.

One of the objects of this invention is to provide a light, strong and thoroughly practical vehicle construction of the above-mentioned character. Another object is to provide a construction particularly for trailers that will be capable of rapid and inexpensive fabrication and well adapted for the application therein of readily constructed steel shapes, such as channels, angles, or the like, which are also readily available commercially. Another object is to provide a vehicle construction in which the load-carrying capacity will be very high compared to the weight of the vehicle itself and to make it possible to achieve a high ratio of pay-load to non-pay-load. Another object is to provide a vehicle construction in which loading and unloading, particularly where the work is to be done manually, may be greatly facilitated and cumbersome and high lifts of the load from the ground to the vehicle floor will be substantially avoided. Other objects will be in part obvious or in part pointed out hereinafter.

The invention accordingly consists in the features of construction, combination of elements, and arrangement of parts as will be exemplified in the structure to be hereinafter described, and the scope of the application of which will be indicated in the following claims.

In the accompanying drawings, in which is shown a preferred embodiment of my invention, Figure 1 is a top plan view of the completely assembled vehicle construction, certain parts being, however, broken away in order to show certain features of construction more clearly.

Figure 2 is a fragmentary detailed view on an enlarged scale showing the relation of certain structural features of the vehicle frame;

Figure 3 is a side elevation, partly in section, as seen from the bottom of Figure 1;

Figure 4 is a detached side elevation of the vehicle frame;

Figure 5 is a rear end elevation, partly in section, on an enlarged scale, as seen from the left in Figures 1 and 3, and Figure 6 is a vertical transverse section, as seen along the line 6—6 of Figure 1, showing a preferred form of bracing for the vehicle frame.

Similar reference characters refer to similar parts throughout the several views in the drawings.

Referring now to the drawings and more particularly to Figures 1, 3 and 5, there is shown a vehicle frame, generally indicated by the reference character 10, one end of which may be supported as by an axle 11 and wheels 12 and 13, while the other and forward end of the vehicle frame may be supported in any suitable or desired manner, illustratively by the rear end of a suitable hauling vehicle 14 supported by wheels 15, the vehicle frame 10 being connected to the hauling vehicle 14 in any suitable manner to permit pivoting of the two vehicle bodies about both a horizontal axis and a vertical axis; such a connection is also preferably detachable and inasmuch as that connection per se is not my invention, I have simply indicated such a possible connection generally at 16.

The vehicle frame 10, which may be made in any suitable or desired length, includes two longitudinally extending side frame members generally indicated at 17 and 18; these side frame members are preferably of identical and symmetrical construction and hence, insofar as their details of construction are concerned, it will suffice to describe only one of them in detail. Accordingly reference may be made first to Figures 3 and 4, in the former of which side frame member 18 appears in side elevation and in the latter of which side frame member 17 appears as it is seen along the line 4—4 of Figure 1.

Side frame member 18 is made up of suitable steel members preferably of angle iron or section and includes a lower member 19 that has two horizontal portions $19^a$ and $19^b$ vertically displaced from one another and joined by an inclined intermediate portion $19^c$. As appears better from Figure 5, angle iron member 19 is positioned so that its horizontal web $19^d$ extends inwardly toward the center of the vehicle frame while its vertical web $19^e$ extends upwardly. Member 19 may be bent to provide the three above-mentioned portions by any suitable device or mechanism.

Displaced vertically from and immediately above the portion $19^a$ is an angle iron member 20 of substantially the same length as the lower horizontal portion $19^a$; the vertical web $20^a$ of the member 20 (see Figure 5) extends downwardly and lies in the same plane with the vertical web $19^e$ of the member 19, while the horizontal web $20^b$ extends inwardly toward the center of the vehicle frame.

Member 20 is connected to the portion $19^a$ by suitably spaced vertical spacing members shown in Figure 3 at 21, 22, 23, 24 and 25; these vertical members are preferably of angle iron section and, as appears better in Figure 5, they are fitted into the angles of the upper and lower members 20 and 19, being welded thereto as is indicated at A. Moreover, these vertical members are positioned and secured so that one of the webs of each lies flush against the vertical webs of the upper and lower members 19 and 20 while the other web of each, extending in a direction crosswise of the vehicle frame, is fitted in between the horizontal webs 19$^d$ and 20$^b$ of these two members. They are, moreover, welded to both of the webs of the members 19 and 20 and they thus dependably hold these members at all times in proper alinement and relation with respect to each other, preventing any tendency of relative tilting between the members 19 and 20 and preventing also relative displacement therebetween in the general direction of their length.

The vertical member 25 (see Figures 3 and 4) is, however, of greater height than the remaining members, and it supports and is welded to the rear end (the left-hand end, as viewed in Figures 3 and 4) of an angle member 26 which has its vertical web resting upon and secured to the vertical web of the upper horizontal portion 19$^b$ of the lower member 19; the vertical webs of the members 26 and 19$^b$ are welded together, as is indicated at B in Figures 3 and 4. The horizontal portion 19$^b$ and part of the superimposed member 26 whose horizontal web extends inwardly toward the center of the vehicle frame, thus form a strong, durable, and rigid frame portion of channel cross-section; this latter portion, moreover, may be and preferably is reinforced and strengthened by short vertical sections of angle iron, all of which are shown in Figures 3 and 4 at 27, 28 and 29, these members being welded to the vertical and horizontal webs of the member 26 and the portion 19$^b$.

Extending substantially parallel to the inclined portion 19$^c$ (Figure 3) of the lower angle iron member 19 is an angle member 30 whose vertical web lies flush against the outside faces of the vertical webs of the portion 19$^a$, the member 20 and the member 26, to which the member 30 is secured preferably as by welding, as is indicated at C in Figure 3; the complementary web of member 30 projects laterally away from the side frame member 18.

The vertical member 25 (Figure 3) is, as already above noted, welded to the members 19, 20 and 26 while the inclined member 30 is welded substantially adjacent the junction of members 20 and 25; thus the parallel members 30 and 19$^c$ with the member 25 and with portions of the members 19 and 26 form a simple, light and inexpensive but strong and rigid truss for maintaining the horizontal stepped side frame 18 against distortion and for insuring efficient load-carrying capacity in spite of the stepped load-carrying flooring which, together with certain advantages thereof, will be more clearly described hereinafter.

The two side frame members 18—19 are held in spaced relation by a plurality of upper and lower cross-members, the latter preferably taking the form of suitable steel members of channel cross-section; thus, referring to Figures 1 and 4, there are shown cross-members, conveniently three in number, at 31, 32 and 33. Cross-members 31 and 32 nest at their ends within the angles formed by the vertical and horizontal webs of the portion 19$^a$ of the lower member 19 of the two side frames 17 and 18 and they are secured thereto in any suitable manner, preferably as by welding, their vertical webs extending upwardly as appears better from Figure 4.

Cross-channel 33 (at the front or right-hand end of the frame as seen in Figures 1, 3 and 4) is secured, preferably as by welding, to the webs of the joined angle steel members 26 and 19$^b$ and forms in effect a front header. It complements the channel sections formd by parts 26 and 19$^b$.

Cross-braces 37 and 38 (see Figures 5, 4 and 1) are crossed and fitted into the angles of the parts 20 and 19$^a$ and are secured, as by bolts 34 (Figure 6), to the inwardly extending webs of the vertical angle members 22 of side frames 17 and 18. Similar cross-braces 35 and 36 (Figures 1 and 4) are secured to the inwardly directed webs of the vertical angle members 25 of side frames 17 and 18, bolts 34 securing them in place and holding them in the angles of parts 26 and 19$^a$ of the side frames. These cross-members are connected at their intersections as by bolts or rivets 71 and coact to prevent tilting of the side frames 17 and 18 out of their respective vertical planes.

Extending crosswise of the frame and nested at its ends in angle portions 19$a$ of the side frames and suitably secured thereto is a cross-member 76 (Figures 1, 3 and 4) just to the left of vertical struts 25; member 76 coacts with cross-braces 35—36 to steady the stepped construction 19$^c$—30—25 etc. and to prevent any tendency for the latter to side-sway or to buckle either about a vertical or a horizontal axis. Member 76 is preferably of angle section.

The forward or right-hand end of the vehicle frame, as viewed in Figures 1 and 3, is cross connected by cross-members 39 and 40 (Figures 1 and 4) which are preferably of angle cross-section and are welded or bolted to the portion 19$^b$ of the lower member 19 of the frames 17 and 18. To the underside of members 39—40 is secured a disk-like plate 41 provided with a suitable kingpin 42 by means of which a detachable connection with a suitable bolster 16, carried by the hauling vehicle 14, may be made. Members 39 and 40 are reinforced against the stresses caused by the hauling or pushing of the vehicle 14 by means of combined tension and compression members 43 and 44 secured at their rear ends to the members 39 and 40 and at their forward ends to the side frames 17 and 18. A cross-member 45 (Figures 1 and 3) similar to members 34, 35 and 36, extends across and is secured to, as by welding, the upper member 26 of the side frames and coacts in holding the latter in their desired or intended relation.

The load is carried by planking 46 (Figure 3) extending crosswise of the members 20 of the side frames 17—18 and by planking 47 extending crosswise of the members 26 of these side frames.

The planking 46 and 47 may be secured to longitudinally extending beams 49 and 50 (Figure 5) of wood, these beams being spaced so that the spaced members 20 of the lower or rear portion of the frames 17 and 18 and the spaced members 26 of the higher and front portion of the frames 17 and 18 are received therebetween and conveniently these wooden stringers 49 and 50 are secured to the side frames in any suitable manner. The planking itself may be secured to the horizontal webs of parts 26 and of parts 20.

Additional longitudinally extending beams or stringers of wood 51 and 52 (see Figure 5) preferably also extend along the outer longitudinal edges of the planking 46 and 47, the latter laterally overhanging the frame. Any suitable means may be provided for retaining the load in place and as illustrative of such a means, I may provide a series of stakes 53, preferably detachable and set in sockets 54 (Figure 5) distributed about the periphery of the stepped flooring 46—47 and these stakes may be provided with suitable rings or the like for receiving a chain or chain sections 55 (Figure 3).

The planking 46, 47, moreover, coacts in the bracing of the frame. Thus, outrigger braces 72, 73, 74, and 75 (Figures 1, 2 and 5) extend diagonally from the side stringers 51, 52 (see Figure 5) downwardly to the part 19$^a$ of the side frames, suitable bolts holding the braces in place. Viewing the structure as seen in Figure 5, the planking 46 with the cross-channel 31, vertical struts 21 and braces 72 and 74 form a truss that further greatly resists bending crosswise of the vehicle and that coacts to resist tendency of side frames 17 and 18 from moving out of their intended parallel and vertical planes. In this action, other parts coact as well; for example, the cross-braces 37—38, as well as certain other parts described hereinafter.

At the mid-section, a similar action is achieved by planking 47, struts 25, cross-member 76 and out-rigger braces 73, 75.

The axle 11 (Figures 3 and 5) is secured to leaf springs 56 and 57 as by spring clips or U-bolts and plates 58 and 59 respectively. The forward or right-hand ends of the springs 56 and 57, as viewed in Figure 3, are pivotally connected to front spring hangers 60 and 61 (Figures 1 and 3), these hangers being provided with vertical webs 60$^a$ and 61$^a$, respectively, adapted to rest against the outer faces of the vertical webs of the portions 19$^a$ of the lower members 19 of frames 17 and 18 to which they are secured as by bolting or riveting, and they have horizontally extending portions, such as the portion 60$^b$ (see Figure 1) shaped to receive the horizontal webs of the frame portions 19$^a$ and also to extend materially toward the center of the vehicle and underneath the lower cross-member 32 to which it is secured as by bolts or rivets 62.

The hangers 60—61, in thus being secured to the channel cross-member 32, reinforce and increase the action of the latter in steadying and holding the frame parts together, while the inwardly extending portions thereof, such as the portion 60$^b$, greatly strengthen the frame construction against any tendency for the built-up side frames 17—18 to tilt out of their respective vertical planes.

The rear or left-hand ends of the springs 56 and 57 (see Figure 3) are slidably received within suitable recesses in the rear spring hangers 63 and 64, respectively. As is better shown in Figure 5, these rear spring hangers 63—64 are constructed somewhat like the above-described spring hangers 60—61, being, like the latter, secure to the vertical webs of the frame portions 19$^a$ as by bolts 65, while their inwardly extended portions 63$^a$ and 64$^a$, respectively (Figure 5), are connected as by bolts 66 to the channel cross-member 31 to give a reinforcing action as above described (see also Figure 2). Bolts 65 also preferably secure braces 72 and 74 to the frame (Figure 5).

Moreover, suitable bolts 76 (Figures 5 and 3) secure the horizontal webs of the frame portions 19$^a$, the various above-described spring hangers, and the channel cross-members with which the latter coact, together. The conjunction and joining together of the two webs of the portion 19$^a$ of the lower frame member 19 with these spring hangers and the mechanical combination thereof with the channel cross-member is better shown in the fragmentary view of Figure 2.

A diagonal member 70 of angle cross-section (see Figures 3 and 4) is interfitted with and extends between the upper end of the vertical strut 21 and the lower end of the vertical strut 22, being secured thereto as well as to the webs of the frame members 19 and 20 in any suitable manner, preferably as by welding. The members 70, one for each of the side frame members 17 and 18, may function either as compression or tension members, depending upon the stresses imposed upon the frame under various conditions of practical use. Diagonal members 70 form the complements to diagonal parts 30 and/or parts 19$^c$ (see Figures 3 and 4) to form therewith and with related parts a complete built-up truss that is light and inexpensive but of great strength and rigidity.

The stepped construction of the vehicle frame is of great practical advantage in that there is thus provided a low rear end load-carrying floor onto which the load may be readily and quickly raised from the ground without requiring a great lift, while at the forward end of the trailer construction, there is provided adequate vertical spacing between the under side of the vehicle frame and the ground to accommodate readily the rear end of the hauling vehicle as well as to permit ready swiveling of the vehicle frame with respect to the wheels supporting the forward end thereof. Moreover, the construction makes it possible to achieve a very great arc of swiveling without undue height of the load-carrying flooring at the rear end where the vehicle is loaded.

The extent of stepping or of the vertical displacement between the planking 46 and the planking 47 may be varied as desired to suit the varying requirements to be met with in practice; in any event such stepping is not excessive and the load, indicated in Figure 3 as constituting barrels, is easily and readily moved from the lower flooring to the higher flooring or vice versa according to whether the vehicle is being loaded or unloaded.

These and many other advantages are achieved without increase in expense or weight of construction. The vehicle frame is fabricated of readily available structural steel parts, is light and strong, and in practice has a high ratio of load-carrying capacity to its own weight. For example, trailers heretofore available and having a carrying capacity of five tons weigh anywhere from 2,000 pounds to over 3,000 pounds but, in accordance with my invention, I am enabled to achieve a structure that has a load capacity of five tons yet weighs less than 900 pounds. In freight hauling, this advantage is of great importance since the pay-load is high and the non-pay-load is but a relatively small fraction of the total. In terms of cost of transportion, I am thus enabled to effect great savings, not to mention the vast reduction in first cost that my invention brings about.

It will thus be seen that there has been provided in this invention a construction in which the various objects hereinabove mentioned, together with many other practical advantages, are successfully achieved.

As many possible embodiments may be made of the above invention, and as many changes may be made in the embodiment above set forth, it is to be understood that all matter hereinabove set forth or shown in the accompanying drawings, is to be interpreted as illustrative and not in a limiting sense.

I claim:

1. In vehicle construction, in combination, a vehicle frame having supporting wheel means at its rear end and having supporting wheel means at its front end, the latter means being adapted to swivel, said frame including side frames each made up of a lower member bent to provide a horizontal front portion and a horizontal rear portion displaced downwardly from said front portion and connected by an inclined intermediate portion, and two upper members, one resting upon said front portion and the other being connected to said rear portion and carried by the latter at a lower elevation than said first mentioned member, and a vertical member connected to said two upper members and to said lower member, and a diagonally extending member connected to one of said upper members, said vertical member and said lower member.

2. In vehicle construction, in combination, a vehicle frame having supporting wheel means at its rear end and having supporting wheel means at its front end, the latter means being adapted to swivel, said frame including side frames each made up of a lower member bent to provide a horizontal front portion and a horizontal rear portion displaced downwardly from said front portion and connected by an inclined intermediate portion, and two upper members, one resting upon said front portion and the other being connected to said rear portion, and a diagonally extending member substantially paralleling said intermediate inclined portion for connecting said last two mentioned members to said lower member.

3. In vehicle construction, in combination, a vehicle frame having supporting wheel means at its rear end and having supporting wheel means at its front end, the latter means being adapted to swivel, said frame including side frames each made up of a lower member bent to provide a horizontal front portion and a horizontal rear portion displaced downwardly from said front portion and connected by an inclined intermediate portion, and two upper members, one resting upon said front portion and the other being connected to said rear portion, means holding said last mentioned member spaced upwardly from said rear portion but spaced upwardly below the member carried by said front portion, and means extending diagonally and joining said rear portion to the member carried thereby and to the member carried by said front portion.

4. In vehicle construction, in combination, a vehicle body having a longitudinally extending frame, said frame including a lower member bent to provide an end portion of lower elevation than its other end portion, and an intermediate inclined connecting portion, a member positioned above said lower end portion, a member resting upon said other end portion, and an inclined member extending substantially parallel to said inclined connecting portion for connecting said lower member and said two upper members together.

5. In vehicle construction, in combination, a vehicle body having a longitudinally extending frame made up of side frames, each side frame including a lower member having an end portion of lower elevation than its other end portion and an intermediate inclined connecting portion, a member positioned above said lower end portion, a member positioned above said other end portion and being at a higher elevation than said second-mentioned member, and a substantially vertical member connecting said lower member and the adjacent vertically displaced ends of said second and third mentioned members.

6. In vehicle construction, in combination, a vehicle body having a longitudinally extending frame made up of side frames, each side frame including a lower member having an end portion of lower elevation than its other end portion and an intermediate inclined connecting portion, a member positioned above said lower end portion, a member positioned above said other end portion and being at a higher elevation than said second-mentioned member, and an inclined member extending substantially parallel to said inclined connecting portion and secured intermediate its ends to the adjacent end of said second-mentioned member and secured at its ends respectively to said third-mentioned member and to said first-mentioned end portion but at points therein remote from their ends.

7. In vehicle construction, in combination, a vehicle body having a longitudinally extending frame made up of side frames, each side frame including a lower member having an end portion of lower elevation than its other end portion and an intermediate inclined connecting portion, a member positioned above said lower end portion, a member positioned above said other end portion and being at a higher elevation than said second-mentioned member, a substantially vertical member connecting said lower member and the adjacent vertically displaced ends of said second and third mentioned members, and an inclined member extending substantially parallel to said inclined connecting portion and crosswise of said vertical member for connecting together said lower member and said two upper members.

HOLMAN H. LINN.